United States Patent Office 2,820,245
Patented Jan. 21, 1958

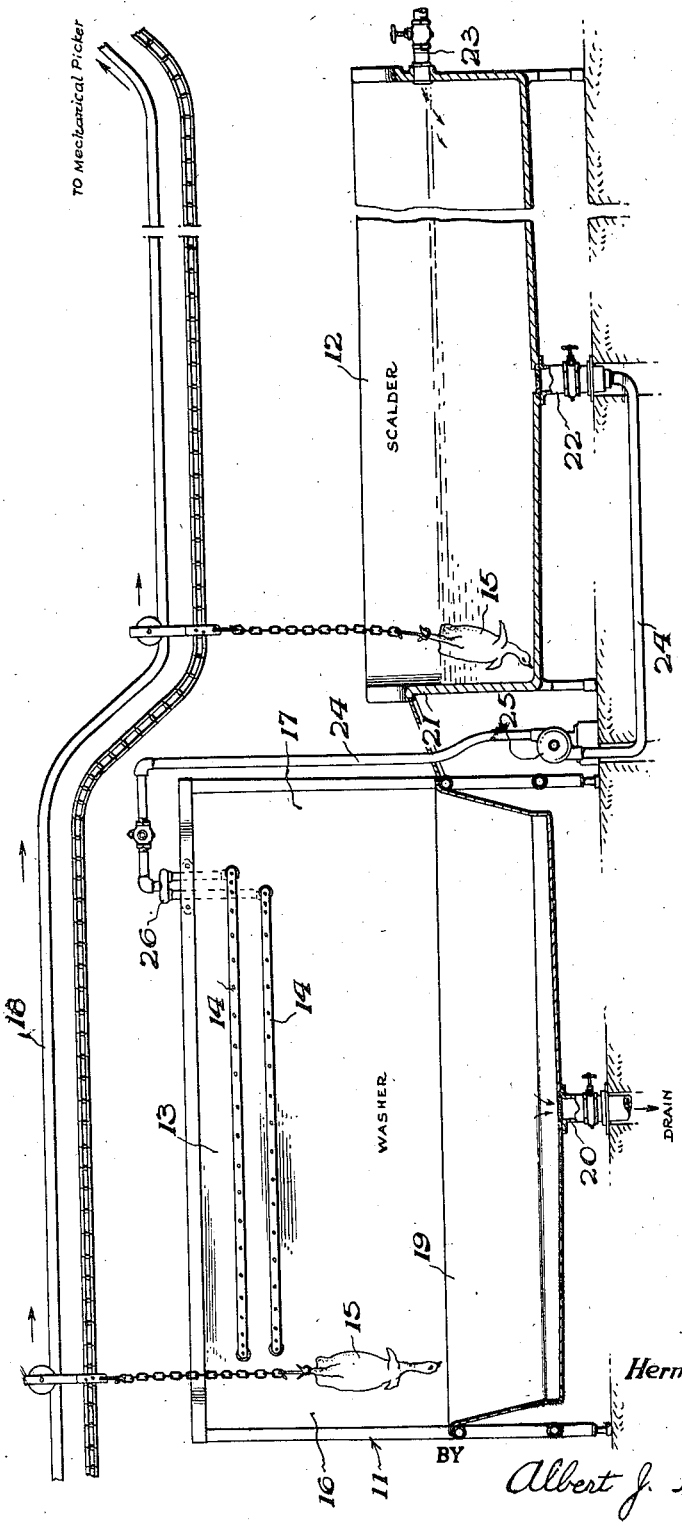

2,820,245

POULTRY PROCESSING APPARATUS

Herman B. Turner, Timberville, Va.

Application February 24, 1955, Serial No. 490,176

3 Claims. (Cl. 17—11.2)

This invention relates to the processing of poultry and is more particularly concerned with the treatment of freshly killed poultry preparatory to defeathering.

In the poultry industry, the conventional method of treating poultry after killing, is to subject the poultry to scalding so as to facilitate the subsequent defeathering operation. It has long been recognized that a proper control of the scalding treatment is highly important in order to prevent loss of bloom or appearance of freshness and also to reduce barking or skin abrasions by the defeathering or mechanical picking machines. Both of these factors are affected by the temperature and the length of time to which the poultry is subjected to the scalding temperature.

In the early development of the poultry industry, high scalding temperatures were used, sometimes as high as the boiling point of water. This resulted in a partial cooking of portions of the poultry adjacent the exterior and in a marked degradation of the poultry due to loss of bloom and high incidence of barking.

As a result, attempts were made to decrease scalding temperatures and the widely accepted conventional practices today employ what is known as "semi-scalding" wherein the temperature of the scalding fluid, usually water, is between 128° and 138° F. and the poultry is subjected to the scalding treatment for a period of about 28 to 30 seconds. This is at best a compromise, however, and does not yield ideal results. There is still considerable barking and loss of bloom.

Scalding tanks used for this purpose are elongated and set parallel to the line of travel of the poultry in the processing plants. The poultry is lowered into the tank at one end and drawn through to the other end for the specified period, whereupon it is withdrawn.

In order to maintain the temperature of the water evenly throughout the length of the scalding tank, circulation pumps, sometimes eight or more, are employed to keep the water thoroughly mixed. Also, the tanks are provided with overflows and inlets, the object being to maintain the temperature of the water at a given value and at the same time to discharge some of the debris that washes off the poultry during the scalding.

This operation, however, is far from satisfactory. Nothing short of a complete change of the scalding water can eliminate this dirt and filth. The overflow procedure simply permits a dilution of the contaminated scalding water, but so long as freshly killed birds are fed to the scalder, it is apparent that the scalding water will never be clean. The dirt, debris and filth tends to increase more and more because each bird entering the scalder adds more than what can possibly be removed by the overflow.

Freshly killed poultry in commercial operations are not only dirty, but they also have blood and loose feathers on their bodies. They usually contain sand and/or soil and chicken manure which they pick up in the yards or coops before slaughtering and some blood attaches to them during the slaughtering or butchering operation. Loose feathers are also developed by the convulsions and beating around of the fowl while dying. Such blood, feathers and foreign matter, collectively referred to herein as "debris," are deposited in the scalding tank and mixed with the water thereof. They accumulate to the point where they interfere with the operation of the circulation pumps which necessitates a stoppage of operations in order to make a complete change of the scalding water and clean the debris out of the circulation pipes and pumps.

The general object of the present invention is the provision of a method of treating freshly killed poultry which eliminates or reduces to a minimum the adverse effects of such debris in the scalder.

Another object of the invention is the provision of a method of treating freshly killed poultry which sharply reduces the temperature of the scalding bath and/or the time of scalding, whereby better bloom is obtained and less or no barking results in the defeathering machine.

A still further object of the invention is the provision of a method of treating poultry which eliminates or minimizes the interference of debris with the pumps of the scalding apparatus.

A still further object of the invention is to prevent work stoppages in the "assembly line" treatment of poultry.

In accordance with the present invention the scalder is eliminated as a cleaning medium. In other words, the scalding of the birds and the cleaning thereof are two separate and distinct operations. I have found that it is possible to wash the debris from poultry in much less time and by the use of much less water than what is involved in the conventional methods of scalding. I have also found that a cleaned fowl can be scalded for the purpose of loosening the feathers thereof preparatory to defeathering, at a lower temperature and/or shorter period of time than can be done with an unclean bird, that is, one containing the usual debris. This appears to be due to the fact that in debris laden poultry, a considerable amount of the debris lies close to and against the skin and also in the pores of the skin, making it difficult for the softening action of the hot water to take effect. By removing the debris from the poultry before being fed to the scalder, the beneficial effects explained above are obtained.

In addition to these benefits, a continuous inflow of fresh water to and an overflowing of water from the scalder is not necessary, because the debris is practically all removed beforehand. The water in the scalder can be maintained at a uniform temperature by direct heat, such as a steam or hot water jacket, or an electrically heated oil jacket.

Instead of scalding under the conventional conditions of 128° to 138° F. for about 28 to 30 seconds, poultry thus cleaned in accordance with this invention may be scalded at a temperature of only 120° to 125° F. for 10 to 20 seconds to give comparable results in the defeathering machine with less barking and better bloom.

The invention is further illustrated schematically in the accompanying drawing which shows as a side elevational view, partly in section, a portion of a poultry processing line in accordance with this invention consisting essentially of a cleaning machine 11 and a scalding tank 12.

The poultry cleaning machine is of the customary types in general use conventionally to clean poultry after the defeathering operation. It comprises a pair of parallel walls 13 (only one shown) each containing spray jet nozzles or heads 14 at the top. It may also contain movable members (not shown) to physically act upon the poultry 15 as it passes through from the inlet side 16 to the exit side 17 along the processing line on a track 18.

The cleaning machine 11 is effective in removing loose feathers, blood, dirt, sand, manure and other debris. It has a catch basin 19 for the dirty water and a drain 20 from the basin for discharging the dirty water. The clean poultry, as it leaves the exit side of the cleaning machine, is immediately lowered into the adjacent end 21 of the scalder 12. The water in the scalder is maintained at a temperature of about 120° to 125° F. A temperature in this range is not considered a cooking temperature. It is removed from the scalder in about 10 to 20 seconds depending upon the temperature of the water. A higher temperature in the range indicated requires less time and vice versa.

In the scalder the water remains relatively clean for prolonged periods of time. The same can be used continuously for an entire day's operation thereby making it unnecessary to shut down operations during the day to change the water.

After leaving the scalder, the poultry is carried on the track 18 to the defeathering machine or mechanical picker (not shown) which may be of any conventional type, such as that described in U. S. Patent No. 2,469,953. Due to the lower temperature in the scalder, there is considerably less degrading of the poultry by the defeathering machine due to barking and the bloom of the poultry is considerably higher.

Water for the cleaning machine 11 may be supplied directly from a fresh water line (not shown) or, alternatively, as illustrated in the drawing, from a bottom outlet 22 of the scalder 12 while an equivalent amount of fresh water is supplied to the scalder through an inlet pipe 23. The pipe 24 containing a pump 25, communicates the outlet 22 with a manifold 26 to which the nozzles 14 are connected. Either method is wholly satisfactory, but the latter has the added advantages of keeping the scalding tank even cleaner and permitting the use of a single heat exchanger (not shown) to furnish hot water for both the scalder and the cleaning machine. In this connection it is to be noted that the amount of water that would thus be withdrawn from the scalder for use by the cleaning machine would be substantially the same as the amount which is conventionally overflowed from the scalder under present day practices in a futile effort to keep the scalding water clean. Thus, as compared to present day practices, this invention does not require the use of any more water and, in fact, results in a saving of water, because a periodic complete change of scalding water during the day is unnecessary and this amount of water is, therefore, saved, together with the fuel required to heat it.

The present invention has for its basic concept the realization that the washing or cleaning of poultry and the scalding thereof require two completely different conditions for optimum results and that prior attempts to carry out both of these operations in a scalding tank resulted in a confusion of the two operations with consequent difficulties as explained above. The scalding operation takes longer to perform than the cleaning operation. The poultry must be in contact with the scalding water for a much longer period of time than with the cleaning fluid. It has not been found economical to use a continuously fresh supply of water exclusively for the scalding operation. Even the jet type of scalders, using jets of water, instead of water baths, require the recirculation of the scalding water for economical operations, because of the enormous quantities of water that would otherwise be required. Recirculation of water in these jet type scalders introduces difficulties similar to those encountered with the usual circulation pumps of scalding tanks, as explained above.

Cleaning machines, however, require relatively little water, no more than what is normally lost by overflow in the conventional scalder and can, therefore, be economically operated with either a continuous supply of fresh, clean water, or by water from the scalder. Consequently, a complete separation of these two operations is possible with the use of no additional water.

Having thus described my invention, I claim:

1. Apparatus for treating freshly killed poultry comprising in combination a cleaning machine and a scalder adjacent each other, said cleaning machine having an inlet and an exit for the poultry to be treated and water spray nozzles between said inlet and exit, said scalder having a water tank and being disposed on the exit side of the cleaning machine, means for withdrawing water from the scalder tank and forcing it through said nozzles, and means for replenishing with fresh water the water thus withdrawn from the said tank.

2. Apparatus for treating freshly killed poultry comprising in combination a cleaning machine and a scalder adjacent each other, said scalder including a water tank, an outlet for water in said tank, and a separate fresh water inlet, said cleaning machine having an inlet and an exit for the poultry to be treated, and water spray nozzles between said inlet and exit, said scalder being disposed adjacent the exit side of the said machine, and means communicatively connecting said outlet to said spray nozzles.

3. Apparatus as defined by claim 2 and a pump for forcing water from the outlet to the spray nozzles.

References Cited in the file of this patent

UNITED STATES PATENTS

| | | |
|---|---|---|
| 1,423,421 | Harding | July 18, 1922 |
| 2,015,058 | Bruce | Sept. 24, 1935 |
| 2,571,032 | Hanson | Oct. 9, 1951 |
| 2,649,615 | Sharp | Aug. 25, 1953 |
| 2,667,661 | Long | Feb. 2, 1954 |
| 2,727,273 | Long | Dec. 20, 1955 |